US012737855B2

(12) United States Patent
Jenoski et al.

(10) Patent No.: US 12,737,855 B2
(45) Date of Patent: Sep. 15, 2026

(54) DIGITAL IMAGING SYSTEM AND METHOD

(71) Applicant: HOLOGIC, INC., Marlborough, MA (US)

(72) Inventors: Raymond Jenoski, Boylston, MA (US); Randall Marks, Marlborough, MA (US)

(73) Assignee: HOLOGIC, INC., Marlborough, MA (US)

( * ) Notice: Subject to any disclaimer, the term of this patent is extended or adjusted under 35 U.S.C. 154(b) by 218 days.

(21) Appl. No.: 18/840,391

(22) PCT Filed: Feb. 24, 2023

(86) PCT No.: PCT/US2023/063289
§ 371 (c)(1),
(2) Date: Aug. 21, 2024

(87) PCT Pub. No.: WO2023/164664
PCT Pub. Date: Aug. 31, 2023

(65) Prior Publication Data

US 2025/0139746 A1 May 1, 2025

Related U.S. Application Data

(60) Provisional application No. 63/315,041, filed on Feb. 28, 2022.

(51) Int. Cl.
*G06T 5/70* (2024.01)
*G06T 5/50* (2006.01)
*G06T 7/50* (2017.01)

(52) U.S. Cl.
CPC .................. *G06T 5/70* (2024.01); *G06T 5/50* (2013.01); *G06T 7/50* (2017.01)

(58) Field of Classification Search
CPC ................ G06T 5/70; G06T 7/50; G06T 5/50
See application file for complete search history.

(56) References Cited

U.S. PATENT DOCUMENTS 6,025,099 A * 2/2000 Slonaker ................ H10P 72/78 430/311
2015/0205126 A1* 7/2015 Schowengerdt ........ G06T 15/00 345/633
2017/0311800 A1* 11/2017 Wang ...................... A61B 3/12

OTHER PUBLICATIONS

International Search Report and Written Opinion mailed Jun. 21, 2023, issued in corresponding International Patent Application No. PCT/US2023/063289, 10 pages.

(Continued)

*Primary Examiner* — Jonathan R Messmore
(74) *Attorney, Agent, or Firm* — Christensen O'Connor Johnson Kindness PLLC

(57) ABSTRACT

Methods and systems for providing multi-plane viewing of a digital image of a subject matter which do not require viewing multiple images taken at multiple image planes. Pseudo-focus images are generated from a flattened, merged image of a three-dimensional subject matter. The merged image is generated by merging a plurality of images taken at different focal planes of the subject matter which form a through-focus image stack. The merged image comprises the best focus pixels originating from different respective image planes. A depth map is also generated from the multiple images which associates each best focus pixel with a pixel depth value. A plane of interest (POI) is selected from the image planes. A pseudo-focus image is then generated using the merged image and pixel depth map by generating a blurred focus value for each best focus pixel based on the focus offset of each pixel from the POI.

11 Claims, 13 Drawing Sheets

(56) References Cited

OTHER PUBLICATIONS

Sakurikar Parikshit et al: "Focal Stack Representation and Focus Manipulation", 2017 4th IAPR Asian Conference On Pattern, Recognition (ACPR), IEEE, Nov. 26, 2017 (Nov. 26, 2017), pp. 250-255, XP033475263, DOI: 10.1109/ACPR.2017.102.

Giusti A et al: "Artificial Defocus for Displaying Markers in Microscopy Z-Stacks", IEEE Transactions On Visualization and Computer Graphics, IEEE, USA, vol. 17, No. 12, Dec. 2011 (Dec. 2011), pp. 1757-1764, XP011444629, ISSN: 1077-2626, DOI: 10.1109/TVCG.2011.168 section 2.1.

Peter Bankhead: "Analyzing fluorescence microscopy images with ImageJ", May 2014 (May 2014), XP055450084, Retrieved from the Internet: URL:https://blogs.qub.ac.uk/ccbg/files/2014/05/2014-05_Analyzing_fluorescence_micros copy_images.pdf.

David E Jacobs et al: "Focal Stack Compositing for Depth of Field Control", Jan. 31, 2012 (Jan. 31, 2012), XP055654614, URL: https://graphics.stanford.edu/papers/focalstack/focalstack.pdf.

European Office Action dated Mar. 18, 2026, for EP Application No. 25223120.4, filed Feb. 24, 2023; 8 pages total.

European Office Action dated Jul. 24, 2025, for EP Application No. 23713542.1, filed Feb. 24, 2023; 8 pages total.

Australian Examination Report No. 1 dated Feb. 26, 2026, for AU Application No. 2023224291, filed Feb. 24, 2023; 3 pages total.

* cited by examiner

| Image Plane | Focus Offset | Multiply |
|---|---|---|
| 0 | 7 | $FocusMask_0$ x $FocusOffset_7$ |
| 1 | 6 | $FocusMask_1$ x $FocusOffset_6$ |
| 2 | 5 | $FocusMask_2$ x $FocusOffset_5$ |
| 3 | 4 | $FocusMask_3$ x $FocusOffset_4$ |
| 4 | 3 | $FocusMask_4$ x $FocusOffset_3$ |
| 5 | 2 | $FocusMask_5$ x $FocusOffset_2$ |
| 6 | 1 | $FocusMask_6$ x $FocusOffset_1$ |
| 7 | 0 | $FocusMask_7$ x $FocusOffset_0$ (merged image) |
| 8 | 1 | $FocusMask_8$ x $FocusOffset_1$ |
| 9 | 2 | $FocusMask_9$ x $FocusOffset_2$ |
| 10 | 3 | $FocusMask_{10}$ x $FocusOffset_3$ |
| 11 | 4 | $FocusMask_{11}$ x $FocusOffset_4$ |
| 12 | 5 | $FocusMask_{12}$ x $FocusOffset_5$ |
| 13 | 6 | $FocusMask_{13}$ x $FocusOffset_6$ |

*Fig. 9*

DIGITAL IMAGING SYSTEM AND METHOD

CROSS-REFERENCES TO RELATED APPLICATIONS

This application is a National Stage of International Application No. PCT/US2023/063289 filed Feb. 24, 2023, which claims the benefit of U.S. Provisional Application No. 63/315,041 filed Feb. 28, 2022, the disclosure of which is incorporated herein by reference.

FIELD OF THE DISCLOSURE

The present disclosure generally relates to digital imaging systems and methods, and more particularly, to digital imaging systems and methods for generating pseudo-focus images of a digital image of a subject matter.

BACKGROUND

Capturing digital images using a camera, such as a digital camera having an imaging sensor (e.g., a charge coupled device (CCD) or CMOS image sensor), typically generates two-dimensional images of a three-dimensional scene. In the case that the field of view of the camera is taking an image of subject matter situated at varying distances from the camera, only the certain region of the scene at an in-focus distance from the camera (the "focus distance") and within a particular in-focus range of the focus distance will be in sharp focus. The in-focus range, i.e., the distance between the nearest and farthest region of the field of view that is in sharp focus, is called the "depth of field" (DOF). In general, the region of the field of view of the camera that is in focus can be adjusted by: (1) adjusting the focus distance of a camera by adjusting the focal length of the camera lens, (2) moving the camera relative to the subject matter in the field of view, and/or (3) moving the subject matter relative to camera. The DOF may also be adjusted to alter the region of the field of view that is in focus by adjusting the camera aperture. In optics, the camera aperture is typically considered in terms of "numerical aperture" (NA), which is effectively how steeply light converges at the focal point of the camera lens. In air, the NA is defined as the radius of the entrance or exit pupil at the first principal plane divided by the focal length. Generally speaking, decreasing the camera NA will increase the DOF, while increasing the camera NA will decrease the DOF.

In certain instances, it is desirable to obtain images of regions of the subject matter at differing focus distances being in focus. For example, a user may want a plurality of images starting at a closest initial location from the camera, and images taken at successively further distances from the initial location, ending in an image furthest from the camera, or vice versa. Each of the images will then have a different region, or depth, of the subject matter in focus.

This process may be particularly useful in imaging biological or chemical specimens under microscope magnification. Due to the high magnification and the numerical apertures required to obtain microscope digital images of biological and chemical specimens, the DOF of the images is very limited. In many cases, the DOF of microscope digital imaging cameras is in the range of 1-3 μm or even less. For example, a microscope digital imaging camera having a combined optical magnification of 40× may have a typical DOF of about 2 μm, whereas the depth or thickness of biological or chemical specimens, such as on a specimen slide, may be 20 μm or more. Thus, an imaging system with these representative specifications would produce an image in which only 2 μm of the total specimen depth of 20 μm is in focus. Thus, obtaining in-focus images of the entire depth of the specimen would require adjusting the focus distance, and/or relative distance between the specimen and the camera multiple times (about 10 times) and taking 10 different images, one at each focus depth. Then, each image would show the portions of the subject matter which are within the DOF at the respective focus depth.

The multiple images taken at different focus depths form a "through-focus" image stack of multiple image planes (10 image planes in the example, above) wherein each image represents an image plane at a different respective focus depth of the specimen. The through-focus image stack may be merged into a single, two-dimensional merged image by selecting the most in-focus pixel from the different image planes for every pixel of merged image and assembling such pixels into the merged image. This creates a single, two-dimensional image in which all of the objects in the image appear to be in-focus regardless of the respective image plane(s) in which the object originated.

The ability to obtain and display microscope digital images of biological or chemical specimens under microscope magnification (e.g., optical magnification of 40× or more) has recently been disclosed for use in cytology and pathology. Instead of a cytologist or pathologist reviewing and analyzing biological specimens on slides using a microscope, digital images of the specimens are taken, and the cytologist or pathologist accesses the digital images to review and analyze the specimen. Cytology is a branch of biology dealing with the study of the formation, structure, and function of cells. As applied in a laboratory setting, cytologists, cytotechnologists, and other medical professionals make medical diagnoses of a patient's condition based on visual examination of a sample of the patient's cells, such sample being referred to herein as a "cytological" specimen. A typical cytological technique is a "pap smear" test, in which cells are scraped from a woman's cervix and analyzed in order to detect the presence of abnormal cells, a precursor to the onset of cervical cancer. Cytological techniques are also used to detect abnormal cells and disease in other parts of the human body.

Cytological techniques are widely employed because collection of cell samples for analysis is generally less invasive than traditional surgical pathological procedures such as biopsies, whereby a solid tissue sample, referred to herein as a "pathologic" specimen, is excised from the patient using specialized biopsy needles having spring-loaded translatable stylets, fixed cannulae, and the like. Cell samples may be obtained from the patient by a variety of techniques including, for example, by scraping or swabbing an area, or by using a needle to aspirate body liquids from the chest cavity, bladder, spinal canal, or other appropriate area. The acquired cell sample is typically placed in a preservative solution and subsequently extracted from the solution and transferred to a glass slide. A fixative is applied to the cell sample to ensure the cells remain in place on the glass slide for facilitating subsequent staining and examination.

Various automated slide imaging systems for capturing images of a cytological specimen fixed to a slide have previously been disclosed. Examples of such imaging systems are disclosed in U.S. Pat. Nos. 7,587,078, 6,665,060, 7,006,674, 7,369,304 and 7,590,492. In addition, the automated slide imaging system may perform a preliminary assessment of the cells using image processing techniques in order to direct the cytotechnologist to potentially the most relevant cells on the slide for close inspection. The imaging system also includes a review station at which a reviewer can review the processed digital images. Whether by inspection of the actual specimen slide under magnification, or of magnified images of the specimen, the specimen is typically classified by the cytotechnologist as either "normal" or "abnormal," where an abnormal sample typically falls in one of the major categories defined by The Bethesda System for Reporting Cervical/Vaginal Cytologic Diagnosis, which categories include Low-Grade Squamous Intraepithelial Lesions (LSIL), High-Grade Squamous Intraepithelial Lesions (HSIL), Squamous Cell Carcinoma, Adenocarcinoma, Atypical Glandular cells of Undetermined Significance (AGUS), Adenocarcinoma in situ (AIS), and Atypical Squamous Cell (ASC). Additional information regarding cell specimen classifications is widely available, such as The Yokohama System for reporting endometrial cytology: Diagnostic Cytopathology, 2018 May; Vol. 46 (5), pp. 400-412; and Guidelines for the Reporting of Nongynecologic Cytopathology Specimens, Archives of Pathology & Laboratory Medicine: November 2009, Vol. 133, No. 11, pp. 1743-1756.

However, there are a number of shortcomings associated with prior systems and methods for generating and displaying a merged image of a subject matter, such as a merged image of a biological or chemical specimen, particularly in the field of digital cytology. For instance, the merged image "flattens" all of the objects in the merged image such that it is not possible to see the relative depth of the objects, or different portions of the object, in the image. For example, if there is an anomalously shaped object in the merged image, it may not be possible to discern whether the object is a single, oddly shaped cell, or two cells that are overlapping but which are at different depths of the sample (i.e., two objects in different image planes of the original image stack). As a result, the object cannot be properly analyzed and characterized, which could cause overlooking cell abnormalities in the specimen indicative of a disease state. Hence, the cytotechnologist cannot make an accurate classification or diagnosis.

One possible solution could be to make available to the reviewer the multiple images taken at different image planes. However, this greatly increases the amount of data that needs to be stored for each merged image. Moreover, this increased amount of image data is especially problematic when the images are stored remotely from the reviewer's location, and the images need to be transmitted to a review station at which the reviewer may review and analyze the images.

Accordingly, there is a need for improved methods and systems for providing multi-plane viewing of a digital image of a subject matter, such as a cytological specimen, without requiring the storage, transfer and/or retrieval of multiple images taken at different image planes.

SUMMARY OF THE DISCLOSURE

Embodiments of improved methods and systems for providing multi-plane viewing of a digital image of a subject matter which do not require accessing multiple images of the subject matter taken at multiple image planes are disclosed and described herein. Although the methods and systems are particularly useful in the context of images of biological and chemical specimens, such as for digital cytology applications, the systems and methods are not limited to such uses, but may be used in any application for providing multi-plane viewing of a digital image of a subject matter. Hence, the embodiments disclosed herein are described for general applications, with more specific examples included for use in digital cytology.

One exemplary embodiment is directed to a method for generating a pseudo-focus image to provide a sense of depth to a digital image of a subject matter disclosed herein. In other words, the method provides for generating a pseudo-focus image of each of the multiple image planes of the digital image. This method utilizes a previously generated merged image of a subject matter having a three-dimensional volume. For example, the subject matter may be a biological sample affixed to a specimen slide which has been imaged by an automated slide imaging system, such as the automated slide imaging systems disclosed and/or referenced herein. The slide imaging system may take a plurality of digital images at different depths of the subject matter which form a through-focus image stack. Then, the merged image is generated which comprises the best focus pixels selected from the plurality of digital images, such that the best focus pixels originate from different respective image planes at different respective depths of the subject matter. Thus, each image plane is one of a plurality of image planes which stack up to form at least a partial depth of the subject matter. The method also utilizes a previously generated pixel depth map which associates each best focus pixel with a respective image plane corresponding to a depth value at which each best focus pixel originated within the subject matter. As two examples, the depth map may be incorporated into the digital image file of the merged image, or it may be a separate file from the digital image file.

Next, a first plane of interest (POI) is selected from the plurality of image planes. For example, the first POI may be a top image plane, a bottom image plane, or any image plane in between. For example, the first plane of interest may be selected in response to a user input while viewing the merged image on a review station or other image display system such as a computing device. The user may view the merged image and use a control function on the review system, such as a slider, dial, or the like, to scroll up and down through the plurality of image planes to input the first POI.

Then, a first pixel focus offset is calculated for each best focus pixel equal to the difference between the depth value of the first POI and the respective depth value for each best focus pixel. In other words, the depth map is utilized to determine the depth value for each best focus pixel, and the first pixel offset is determined by taking the difference between such depth value and the depth value of the first POI. As an example, take a merged image that is generated from 14 images taken at 14 sequential focus depths of the subject matter, such that the image planes may be numbered from 0 to 13, with image plane 0 being the bottom image plane and image plane 13 being the top image plane, of the plurality of image planes. For example, assume image plane 7 is selected as the first POI (i.e., about the middle of the image stack). Then, the first pixel offset for each respective best focus pixel is the difference between the depth value of image plane 7 (the first POI) and the depth value of each respective best focus pixel.

A first blurred focus value is then generated for each best focus pixel based on the respective first pixel focus offset. In an additional aspect, the blurred focus value for each best focus pixel may be generated using a Gaussian blur function. In order to simulate the blur that would be present in the images taken by the imaging system, the Gaussian blur function may utilize a Gaussian blur radius based upon the depth of field of the camera system of the imaging system and/or the effective numerical aperture of the camera system.

Then, a first pseudo-focus image of the final merged image for the first POI is generated by the composition of the first blurred focus values for each best focus pixel. In another aspect of the method, the first pseudo-focus image may then be displayed on a display device, such as an LCD display, an LED display, an OLED display, and a computer monitor.

In still another aspect, the method may further include generating a pseudo-focus image at another, or second, POI. The selection may be in response to a user input similar to the first POI. Then, a second pixel focus offset is calculated for each best focus pixel equal to the difference between the depth value of the second POI and the respective depth value for each best focus pixel, similar to calculating the first pixel focus offset. For instance, say the user now selects image plane 8 (the second POI) in the example above. The second pixel offset for each respective best focus pixel is the difference between the depth value of image plane 8 (the second POI) and the depth value of each respective best focus pixel (obtained from the depth map).

A second blurred focus value is generated for each best focus pixel based on the respective second pixel focus offset, similar to generating the first blurred focus values, such as by using a Gaussian blur function. A second pseudo-focus image of the final merged image for the second POI is generated by the composition of the second blurred focus values for each best focus pixel. In still another aspect, the second pseudo-focus image may be displayed on the display device.

The process of generating, and displaying, a pseudo-focus image of any POI may be repeated for the selection of any POI. Indeed, a user can scroll up and down through the image planes and the method can generate, and/or display, the pseudo-focus image for the selected image plane as the user scrolls through the image planes, in substantially real-time. The term "substantially real-time" means that there is negligible lag noticeable by the user between the selection of a POI and the display of the pseudo-focus image for such selected POI. In another aspect, any one or more of the pseudo-focus images for selected POIs can be stored, such as in a buffer or otherwise, as the POIs are selected, and respective pseudo-focus images are generated. Then, if the user selects a previously selected POI, the method displays the stored pseudo-focus image for such POI. The buffering may smooth out the processing times for displaying the pseudo-focus images in substantially real-time.

In another aspect of the method, some of the steps can be performed over the entire merged image to make the processes faster and/or more efficient. In one aspect, the step of calculating the first pixel focus offsets for each best focus pixel may be determined for all of the best focus pixels by generating a pixel focus offset array. The pixel focus offset array includes a pixel focus offset for each best focus pixel equal to the difference between the depth value of the first POI and the respective depth value for each best focus pixel, for the entire merged image. The pixel focus offset array defines a range of pixel focus offsets within which a plurality of focus offset values are defined.

Furthermore, the step of generating the first blurred focus values for each of the best focus pixels may be performed by applying a blur function to the entire merged image for each of the pixel focus offsets within the range of pixel focus offsets. This may done by generating a pixel focus offset array by calculating a pixel focus offset for each best focus pixel equal to the difference between the depth value of the first POI and the respective depth value for each best focus pixel, the pixel focus offset array defining a first range of pixel focus offsets within which a plurality of focus offset values are defined.

A plurality of focus offset images are generated which correspond to each first focus offset within the range of the pixel focus offset array. Each focus offset image is generated by: (1) generating a blurred focus value for each of the focus offset values, and (2) for each focus offset value, applying a respective blurred focus value to the merged image. For instance, in the example above in which the first POI is image plane 7, the range of first focus offsets is 0 to 7 (i.e., the focus offset of each image plane is the absolute value of the difference between the image plane value and the first POI; hence image plane 0 has a first focus offset of 7, image plane 1 has a first focus offset of 6, . . . image plane 7 has a first focus offset of 0, image plane 8 has a first focus offset of 1, and so on). This process generates a focus offset image for each offset from 0 to 7, in which each focus offset image includes a blurred focus value for the respective focus offset for every best focus pixel. For example, the focus offset image 7 having a focus offset of 7 is an image with all of the pixels in the merged image at a blurred focus value of 7, the focus offset image 6 for the first focus offset of 6 is an image with all of the pixels in the merged image at a blurred focus value of 6, and so on for focus offsets from 0 to 7.

In still another aspect, generating the pseudo-focus image for a particular POI, such as the first POI, may also be accomplished in a convolved manner by generating a focus mask for each image plane. Each focus mask contains all of the best focus pixels associated with the respective image plane. In other words, focus mask 0 consists of all of the best focus pixels within image plane 0, focus mask 1 consists of all of the best focus pixels within image plane 1, and so on. Then, a pseudo-focus image is generated by summing the product of (1) the focus mask for a respective image plane and (2) the focus offset image having the focus offset value corresponding to the respective image plane, for each image plane of the plurality of image planes. In the example above having 14 image planes 0 to 13, the pseudo-focus image is the sum of:

the product of focus mask 0 (for image plane 0 having a focus offset value of 7) and focus offset image 7+ the product of focus mask 1 (for image plane 1 having a focus offset value of 6) and focus offset image 6+ . . . + the product of focus mask 7 (for image plane 7 having a focus offset value of 0) and focus offset image 0+ the product of focus mask 8 (for image plane 8 having a focus offset value of 1) and focus offset image 1+ . . . for all 14 image planes 0 to 13.

Furthermore, the convolved processes may be used to generate respective pseudo-focus images for the selection of any POI. Indeed, the process for generating each successive pseudo-focus image can be further streamlined by buffering the focus offset images for the respective focus offset values as they are generated for each selected POI. In the example above, the focus offset images for focus offset values 0 to 7 are generated and buffered when image plane 7 is selected as the POI. Take for example, a second POI selected as image plane 10. The range of focus offset values for second POI being image plane 10 is from 0 to 10 (image plane 0 has a focus offset value of 10, image plane 1 has a focus offset value of 9, image plane 2 has a focus offset value of 8, image plane 3 has a focus offset value of 7, and so on for image planes 4 to 13). Hence, focus offset images have previously been generated for focus offset values 0 to 7, and additional focus offset images for only focus offset values 8 to 10 need to be generated for creating a pseudo-focus image for second POI/image plane 10. After generating the focus offset images for focus offset values 8 to 10, the pseudo-focus image is generated by summing the product of (1) the focus mask for a respective image plane and (2) the focus offset image having the focus offset value corresponding to the respective image plane, for each image plane of the plurality of image planes. The newly generated focus offset images for focus offset values 8 to 10 may also be buffered for use where needed to generate a pseudo-focus image for subsequently selected POIs.

In yet another aspect of the method, the merged image may be an RGB digital image file, and the pixel depth map is stored in a channel of the RGB digital image file. Alternatively, the merged image may be stored as a digital image file and the depth map may be stored in a separate file from the digital image file.

In still another aspect, the method for generating a pseudo-focus image may also include capturing a plurality of images of the subject matter, processing the images to generate a merged image, and generating a pixel depth map. First, a plurality of images of a subject matter are captured utilizing a digital camera system. The plurality of images are focused through a range of depths of the subject matter, such that the images together form a through-focus group of images comprising a plurality of image planes at different depth values of the subject matter such that there are multiple pixels from different image planes for each pixel in a final merged image. Next, best focus pixels from the through-focus group of images are determined for each pixel in the final merged image. The final merged image of the plurality of images is generated by combining the best focus pixels for each pixel in the final merged image. A pixel depth map is generated by determining and associating a depth value for each best focus pixel within the final merged image.

In another aspect, the plurality of images may be captured using a camera system having an optical axis which is non-orthogonal to a surface of the subject matter, or a surface to which the subject matter is affixed, such as a specimen slide or imaging platform.

Another embodiment disclosed herein is directed to a second method for generating pseudo-focus images of a digital image to provide a sense of depth to the digital image. Similar to the method described above, a merged digital image of the subject matter is accessed. Again, the subject matter may be a biological sample affixed to a specimen slide which has been imaged by an automated slide imaging system, such as the automated slide imaging systems disclosed and/or referenced herein. The plurality of digital images are taken at different depths of the subject matter such that the images form a through-focus image stack. The merged image comprises the best focus pixels selected from the plurality of digital images, such that the best focus pixels originate from different respective image planes at different respective depths of the subject matter, wherein each image plane is one of a plurality of image planes which stack up to form at least a partial depth of the subject matter. The method also utilizes a previously generated depth map which associates each best focus pixel with a respective image plane corresponding to a depth value at which each best focus pixel originated within the subject matter. As two examples, the depth map may be incorporated into the digital image file of the merged image, or it may be a separate file from the digital image file.

Next, a first plane of interest (POI) is selected from the plurality of image planes. This step is the same as in the first method embodiment described above. The method then utilizes an overall merged image approach to generate a pseudo-focus image for the selected POI, same or similar to the process described as an aspect of the first method embodiment. A plurality of focus offset images are generated with each focus offset image corresponding to each focus offset value within the range of the pixel focus offset array by: (1) generating a blurred focus value for each of the focus offset values, and (2) for each focus offset value, applying a respective blurred focus value to the merged image. This is the same or similar to the process described above, which results in a focus offset image for each focus offset value.

A focus mask for each image plane is also generated, wherein each focus mask contains all of the best focus pixels associated with the respective image plane. For example, if there are 14 image planes for the merged image, 0 to 13, as in the example above, then a focus mask for each of the 14 image planes is generated, including a focus mask 0 consisting of the best focus pixels in image plane 0, a focus mask 1 consisting of the best focus pixels in image plane 1, and so on for all 14 image planes.

Then, the pseudo-focus image is generated as an amalgamation of the focus offset values for each respective pixel for the focus offset value in which each respective pixel originated. This is accomplished by associating each of the focus masks with its appropriate focus offset image, and then each association is summed to form the pseudo-focus image. In other words, the first pseudo-focus image is generated by summing the product of (1) the focus mask for a respective image plane and (2) the focus offset image having the focus offset value corresponding to the respective image plane, for each image plane of the plurality of image planes.

In another aspect of the method, the first pseudo-focus image may then be displayed on a display device, such as an LCD display, an LED display, an OLED display, and a computer monitor.

In still another aspect, the method may further include generating a pseudo-focus image at another, or second, POI. The selection may be in response to a user input similar to the first POI. A second, or supplemental, pixel focus offset array is generated by calculating a pixel focus offset for each best focus pixel equal to the difference between the depth value of the second POI and the respective depth value for each best focus pixel, the second pixel focus offset array defining a second range of pixel focus offsets within which a plurality of focus offset values are defined. Additional focus offset images are generated corresponding to each focus offset value within the second range of pixel focus offsets, only for such focus offset values not generated for the first POI, each additional focus offset image generated by: (1) generating a blurred focus value for each of the focus offset values, and (2) for each focus offset value, applying a respective blurred focus value to the merged image. Continuing the example above, in which the second POI is selected as image plane 10. The range of focus offset values for the second POI being image plane 10 is from 0 to 10 (image plane 0 has a focus offset value of 10, image plane 1 has a focus offset value of 9, image plane 2 has a focus offset value of 8, image plane 3 has a focus offset value of 7, and so on for image planes 4 to 13). Hence, focus offset images have previously been generated for focus offset values 0 to 7, and additional focus offset images for only focus offset values 8 to 10 need to be generated for creating a pseudo-focus image for second POI/image plane 10. After generating the additional focus offset images, a second pseudo-focus image is generated by summing the product of (1) the focus mask for a respective image plane and (2) the focus offset image having the focus offset value corresponding to the respective image plane, for each image plane of the plurality of image planes. The newly generated focus offset images for focus offset values 8 to 10 may also be buffered for use where needed to generate a pseudo-focus image for subsequently selected POIs. The second pseudo-focus image may then be displayed on a display device, such as an LCD display, an LED display, an OLED display, and a computer monitor.

In another aspect, the process of generating, and displaying, a pseudo-focus image of any POI may be repeated for the selection of any number of POIs. The user can scroll up and down through the image planes and the method can generate, and/or display, the pseudo-focus image for the selected image plane as the user scrolls through the image planes, in substantially real-time, by repeating the above process for generating the second pseudo-focus image. In another aspect, any one or more of the pseudo-focus images for selected POIs can be stored, such as in a buffer or otherwise, as the POIs are selected, and respective pseudo-focus images are generated. Then, if the user selects a previously selected POI, the method displays the stored pseudo-focus image for such POI. The buffering may smooth out the processing times for displaying the pseudo-focus images in substantially real-time.

In another aspect, the second method may also capture a plurality of images of the subject matter, process the images to generate a merged image, and generate a pixel depth map, same or similar to the method described above.

In yet another aspect of the second method, the focus offset images for each focus offset value may be generated using a two-dimensional Gaussian blur function. In another aspect, the Gaussian blur function may utilize a Gaussian blur radius based upon the depth of field of the camera system of the imaging system and/or the effective numerical aperture of the camera system, in order to simulate the blur that would be present in the images taken by the imaging system.

In still another aspect of the second method, the merged image may be an RGB digital image file, and the depth map is stored in a channel of the RGB digital image file, or alternatively, the merged image may be stored as a digital image file and the depth map may be stored in a separate file from the digital image file.

Another embodiment described herein is directed to an image review system for generating a pseudo-focus image to provide a sense of depth to a digital image of a subject matter according to any of the methods disclosed herein. The review system includes a computing system and a display device. The computing system includes one or more software application(s), one or more microprocessors (CPU), memory, and a network adapter. The computing system may also have a graphics processing unit (GPU) for improving the speed in handling large digital image files. The computing system may also include input device(s) such as a keyboard, mouse, touchpad, etc. The display device is operably coupled to the computing system and is configured to display images generated by the computing system. The display device may be any suitable display such as an LCD display, an LED display, an OLED display, or other computer monitor. The display device may be a touchscreen monitor such that the touchscreen is also an input device. The one or more software applications are configured to program the computing system to perform at least one of the methods for generating a pseudo-focus image to provide a sense of depth to a digital image of a subject matter, as disclosed herein. As an example, the review station may be configured to access and view merged digital images of biological specimens. For example, the review system may be a cytological review station, pathology review station, or the like.

In another aspect of the image review system, the computing system may be in network communication, via the network adapter, with a remote storage system on which the merged images and depth map files are stored. For example, the remote storage system may be a part of an automated imaging system, such as an automated slide imaging system for taking images of specimens on slides. The remote storage system may also be a cloud-based storage system. In this case, the computing system may access the merged images and depth files from the remote storage system via a communication network. The communication network may include one or more of a local area network (LAN, e.g., Ethernet), wide area network (WAN), the internet (e.g., virtual private network (VPN)), and/or other suitable network.

Accordingly, a user may utilize the computing system to access a merged image file and associated depth map, and view the merged image file. The user may select various POIs within the merged image and view pseudo-focus images for the selected POIs.

Other and further features and advantages of the disclosed embodiments of methods and system for providing multi-plane viewing of a digital image of a subject matter which do not require accessing multiple images of the subject matter taken at multiple image planes are depicted in the accompanying figures and described in the below detailed description of the same.

BRIEF DESCRIPTION OF THE DRAWINGS

The foregoing and other aspects of embodiments are described in further detail with reference to the accompanying drawings, where like reference numerals refer to like elements and the description for like elements shall be applicable for all described embodiments wherever relevant:

FIG. 9 is a table showing, for each image plane of the example merged image of FIG. 7, the focus offset and the product of the focus mask and the focus offset image for each respective image plane;

DETAILED DESCRIPTION OF THE ILLUSTRATED EMBODIMENTS

Figure 1:
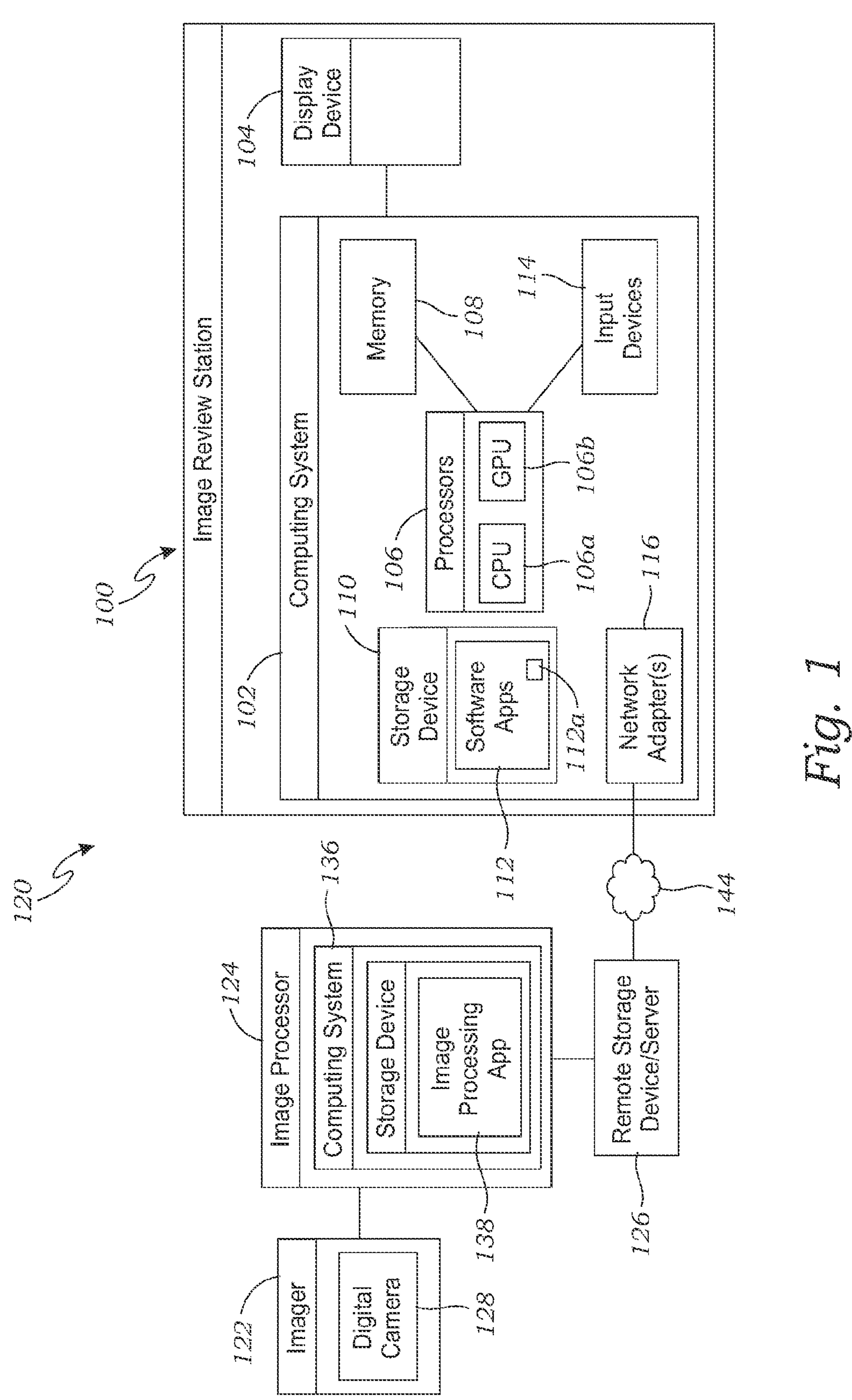
FIG. 1 is a block diagram of a digital imaging system, including an image review station, according to one embodiment.

FIG. 1 illustrates a block diagram of one embodiment of an image review station 100 which provides multi-plane viewing of a digital image of a subject matter which does not require accessing multiple images of the subject matter taken at multiple image planes. The subject matter has a three-dimensional volume, including a depth along an axis orthogonal to the major plane of the subject matter. This is accomplished by an innovative process for generating pseudo-focus images of a merged image to provide a sense of depth to the digital image. The systems and methods described herein may be utilized for multi-plane viewing of digital images of any subject matter in which the images are taken at multiple image planes for a depth of the subject matter. Still, the systems and methods are particularly useful in the context of images of biological and chemical specimens, such as for digital cytology applications, but the systems and methods are not limited to such uses. Hence, the system and method embodiments described in detail herein are disclosed in the context of digital cytology, wherein the subject matter imaged in the digital images are biological and chemical specimens. Nevertheless, the systems and methods disclosed herein are not limited to use with images of biological and chemical specimens, but may be used for providing multi-plane views of digital images of any type of subject matter.

The image review station 100 includes a computing system 102 and a display device 104 operably coupled to the computing system 102. The computing system 102 includes one or more microprocessors 106, which may include one or more computer processors (CPU) 106*a* and one or more graphics processors (GPU) 106*b*. The computing system further includes memory 108, one or more storage devices 110 (e.g., local hard drive(s) for storing software applications 112 and data), one or more network adapters 116, such as LAN, WAN, USB network adapters, and other input/output ports 118 (I/O ports such as USB ports). The software applications 112 include an image processing software application 112*a* (described in more detail below). The computing system also includes one or more input device(s) 114 such as a keyboard, mouse, touchpad, etc. for allowing a user to interact with the computing system 102. The display device 104 may be a touchscreen monitor such that the touchscreen is an input device 114.

As depicted in FIG. 1, the image review station 100 may be part of a digital imaging system 120 which includes an imager 122, an image processor 124, and a remote storage system 126. The imager 122 has a digital camera 128 for acquiring digital images of the subject matter. For instance, the imager 122 may be an automated digital imaging system for automatically acquiring a plurality of digital images of specimens on respective substrates having specimen(s) disposed on the substrates. The substrates may be microscope specimen slides, or any other suitable substrate, such as a microplate, microarray, or other suitable media. The automated digital imaging system has substrate handling devices (e.g., robots) for handling a large load of substrates with specimens, and digitally imaging each of the specimen substrates. Suitable automated digital imaging systems are disclosed in U.S. patent application Ser. No. 17/282,380. The contents of all publications cited herein, including without limitation, patents and patent applications, are incorporated by reference in their entireties for all purposes.

Figure 2:
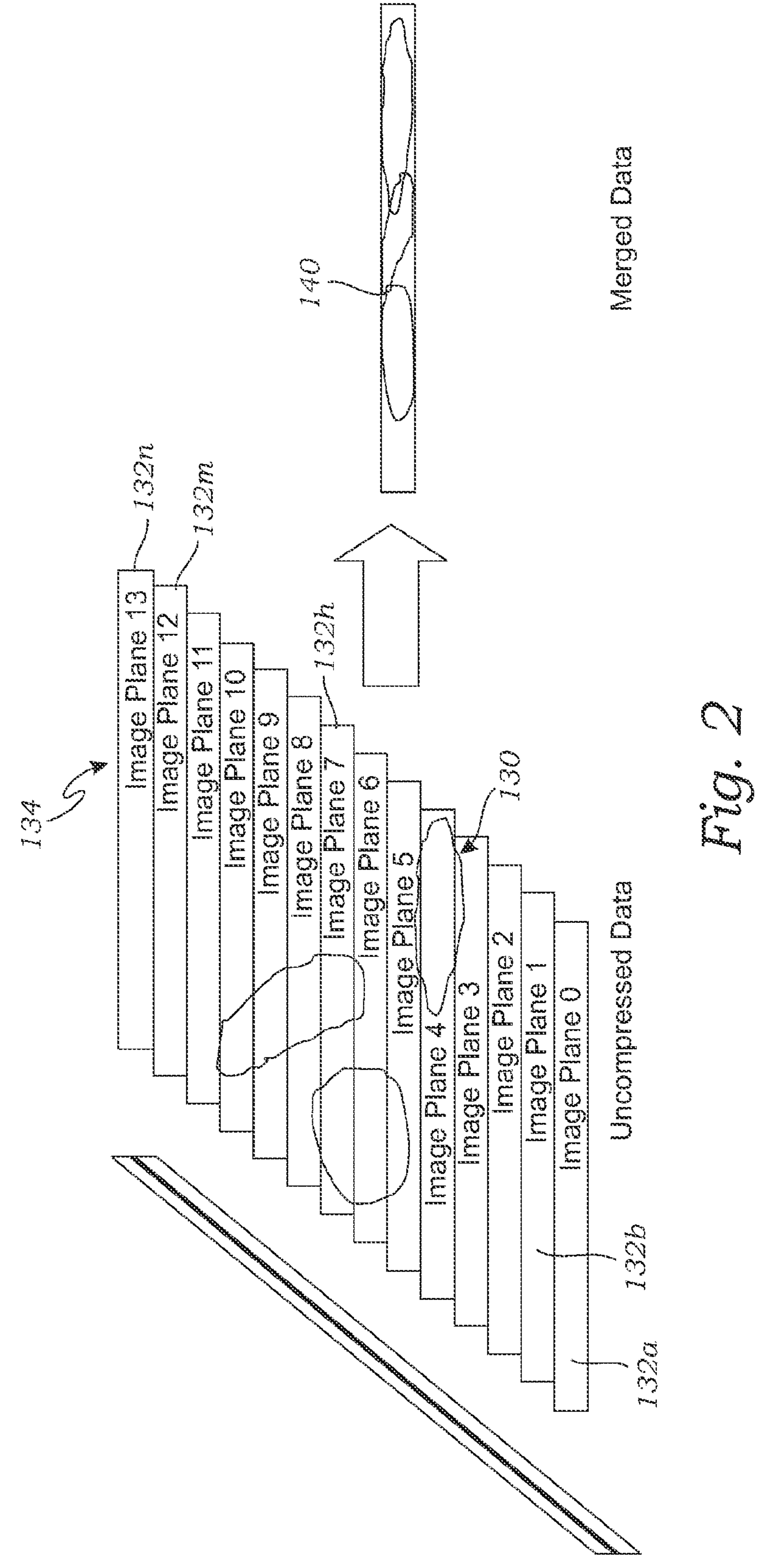
FIG. 2 is an illustration showing an example of multiple imaging planes of a plurality of images taken at different focus depths of a subject matter, wherein the multiple imaging planes form a though-focus image stack, and a merged image of best-focus pixels generated from the plurality of images.

The imager 122 is configured to acquire a plurality of digital images of the subject matter wherein the digital images are focused through a range of depths of the subject matter such that the plurality of digital images of the subject matter together form a through-focus group of images, or "image stack." Turning to FIG. 2, an example of multiple imaging planes generated from a plurality of images taken at different focus depths of a subject matter 130 (also referred to as a specimen 130), wherein the multiple imaging planes 132 form a though-focus image stack 134, is illustrated. In the illustrated example of FIG. 2, there are 14 image planes, namely, image plane 132*a* (the bottom image plane) through image plane 132*n* (the top image plane). As shown in FIG. 2, each image plane 132*a*-132*n* is at a different respective depth of the subject matter 130, from the bottom image plane 132*a* up through the subject matter 130 to the top image plane 132*n*. The plurality of digital images is acquired by the digital camera 128 of the imager 122. Examples of systems and methods for acquiring the plurality of digital images is also described in U.S. patent application Ser. No. 17/282,380.

Figure 3:
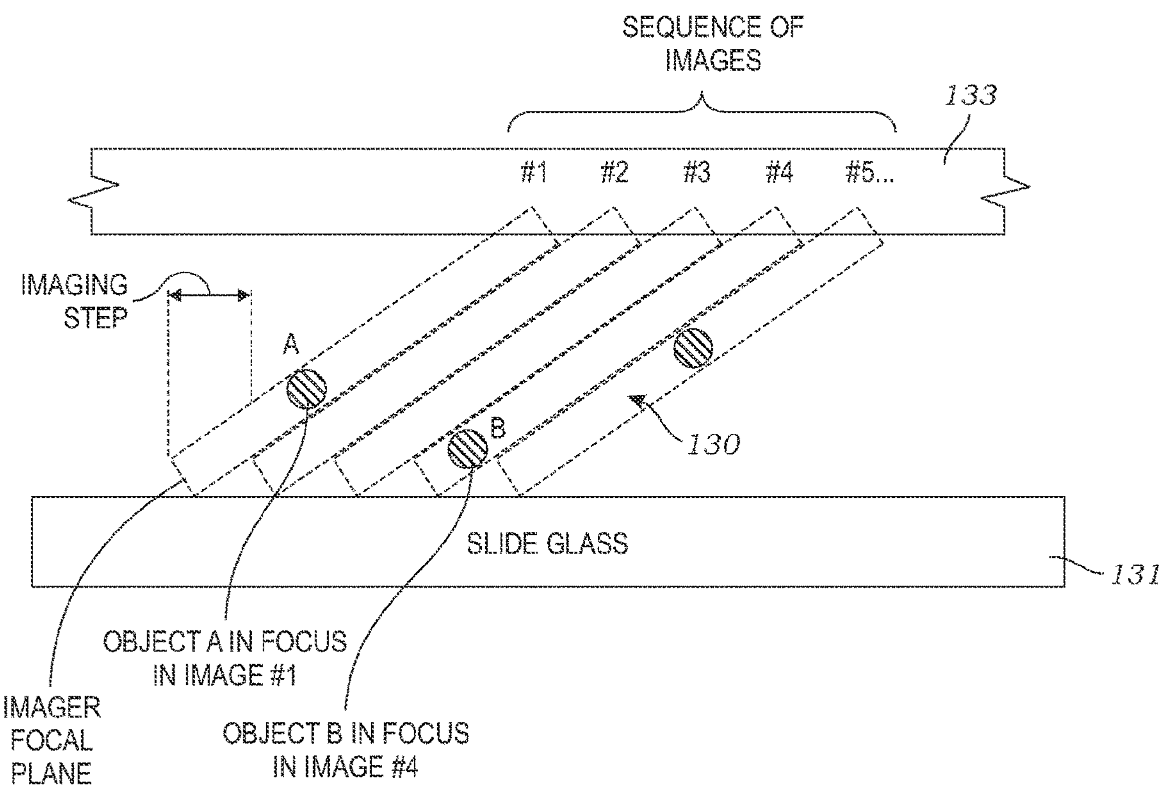
FIG. 3 is an illustration showing a tilted imaging plane of a digital imager and a sequence of tilted images taken by the digital imager, wherein the optical axis of the camera of the digital image is non-orthogonal to the main plane of the specimen slide to which the specimen is affixed.
Figure 4:
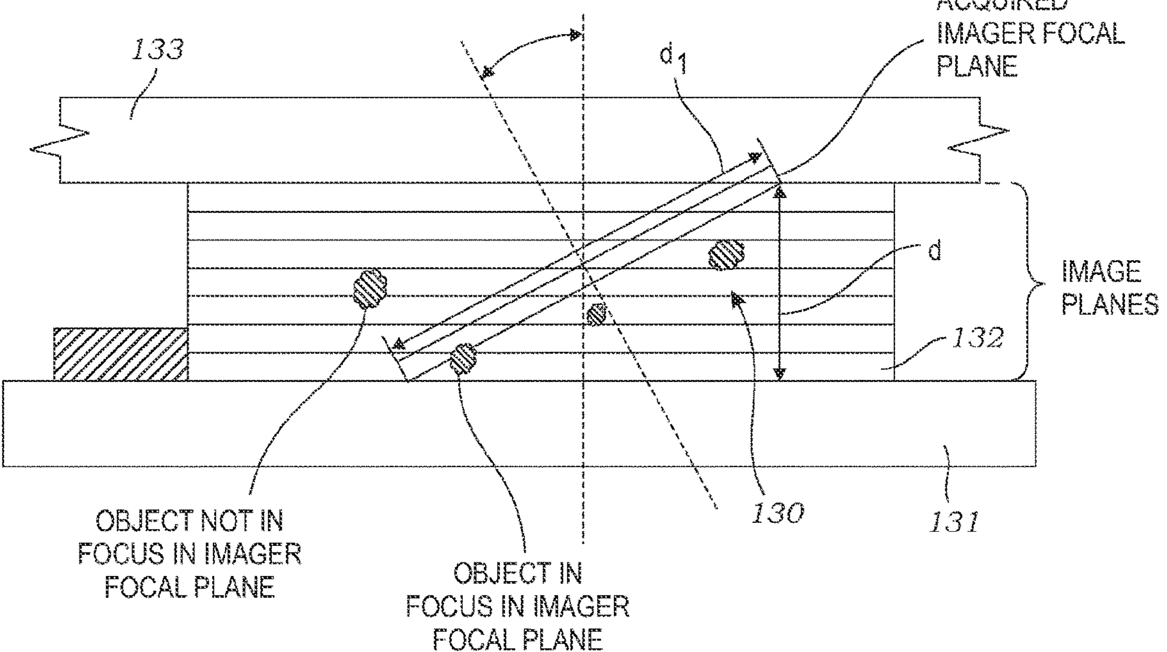
FIG. 4 is an illustration showing a tilted imaging plane of a digital imager and the vertically re-assembled image planes in a through-focus image stack of the tilted images taken by the tilted camera.

For microscopic imaging, the field of view of the digital camera 128 is typically much smaller than the area of the specimen 130 to be imaged. Accordingly, the digital camera 128 and the specimen 130 are moved relative to one another to scan the field of view of the camera 128 over the entire specimen area (or a predetermined partial area of the entire specimen 130). In order to obtain digital images at the different focus depths of the plurality of image planes 132, the focus depth of the camera 128 may be adjusted at each scan location to obtain images at the different image planes, or alternatively, as shown in FIGS. 3 and 4, the optical axis of the digital camera 128 may be non-orthogonal to the plane of the specimen 130. A shown in FIG. 3, the digital camera 128 utilizes an imager focal plane that is tilted relative to the specimen 130 on the specimen slide 131 having a specimen slide cover 133. Because the imager focal plane is tilted relative to the specimen 130 on the slide 131, different sub-regions of the camera pixel array capture images of the specimen 130 at different depths of the specimen 130. Accordingly, object A is captured in focus by the camera 128 in imaging position #1, but in that same camera frame, object B is near the right edge of the frame and well out of focus. Instead of stepping the camera position by the length of the field of view in the scan direction between images, a step size equal to the image sub-region matching the depth of field of the imaging optics is used. The sequence of digital images may overlap. While object A is in focus with the camera in position #1, object B is captured in focus when the camera reaches position #4. In this way, all objects within the height equal to the difference between the left and right edges of the imager focal plane are captured in focus in one or more of the digital images in the sequence.

The image processor 124 is configured to process the plurality of images acquired by the imager 122, including generating a merged image 140 of the through-focus image stack and generating a pixel depth map associating each best focus pixel with a depth value at which the best focus pixel originated within the image stack. The computing system 136 may be the same or similar to the computing system 102. The computing system 136 includes an image processing software application 138 which programs the computing system to access and process the digital images acquired by the imager 122. The image processor 124 processes the plurality of digital images to form the merged image 140 comprising the best focus pixels from the different image planes 132 at different respective depths for each pixel of the merged image 140. Methods for processing the plurality of digital images to form a merged image are also described U.S. patent application Ser. No. 17/282,380.

The following describes one exemplary method performed by the image processor 124 for processing the plurality of digital images to generate the merged image 140 and its associated pixel depth map. The digital camera 128 may utilize a Bayer mask (a color filter array for arranging RGB color filters on a grid of photosensors). In such case, the first step in the image processing algorithm, is to de-Bayer and convert the images to RGB images (a bitmap image holding red/green/blue values for each pixel). The digital images are uniformity and distortion corrected, such as through a pre-mapped calibration table, to correct optical distortions in the digital images. The table contains entries for each pixel position in the corrected image result. Each entry indicates a 2×2 pixel subregion of the source image and weighting factors to be applied to those source pixels and summed to obtain the resulting pixel value. This allows for the corrected image to represent (by interpolation) the sub-pixel shifts required to correct for small optical distortions measured during the calibration process.

As illustrated in FIG. 4, in the case that the imager 122 is configured with the optical axis of the digital camera 128 non-orthogonal to the plane of the specimen 130 (i.e., the imager focal plane is tilted relative to the plane of the specimen 130), the camera pixel array is divided into the plurality of image planes 132 (e.g., 14 image planes 132) wherein the image planes represent different focal planes across the specimen depth. Once the same sample region (a tile) is captured in each image plane 132, those image planes 132 are re-assembled vertically to make the through-focus image stack 134 of the tile.

Figure 5:
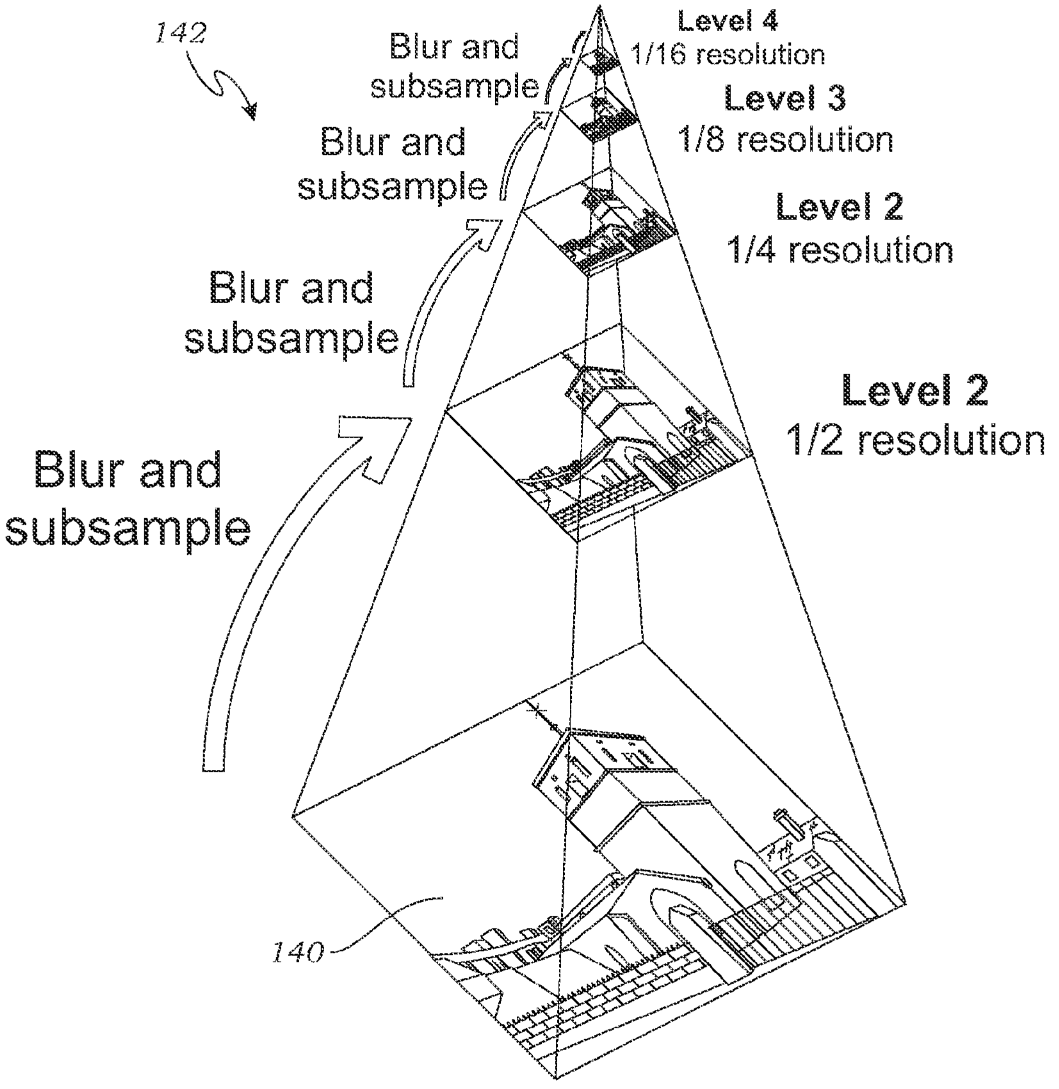
FIG. 5 is an illustration of a pyramid image of a merged image, which includes sequentially reduced resolution images of the merged image.

Once all of the sub-region images (e.g., 14 sub-regions) for a tile have been captured, the best focus pixels from the different respective image planes are selected for each pixel of the merged image to generate the merged image. In one exemplary process, the difference between each pixel and certain pixels in its neighboring region is calculated. This difference is then weighted based on the pixel's value to determine the relative merit of that particular plane for that particular pixel, producing a tile of plane values (e.g., 0 through 13). A moving average is then applied to the tile of plane values to provide a better transition between objects in the final image. The best focus pixels of the merged image are then selected based on the associated plane values. The merged image tiles are then tiled together to generate a swath. Once the complete swath is assembled, it is stitched onto the prior swaths. Once the images of the entire specimen 130 have been stitched together, the full merged image 140 may be compressed. For instance, the merged image 140 may be compressed in an approximate 20:1 ratio using JPEG, JPEG 2000, or other suitable compression algorithms, and storing the merged image 140 as a TIF file or JPG file. As depicted in FIG. 5, a pyramid image 142 may also be generated from the merged image 140. The pyramid image 142 assists in image rendering and display on the display device 104 while at lower magnifications. The pyramid image 142 subsamples the merged image 140 in progressively lower resolutions for display purposes until the smallest required image is generated. For example, the pyramid image may include four levels in successively decreased resolution from ½ resolution down to 1⁄16 resolution.

Figure 6:
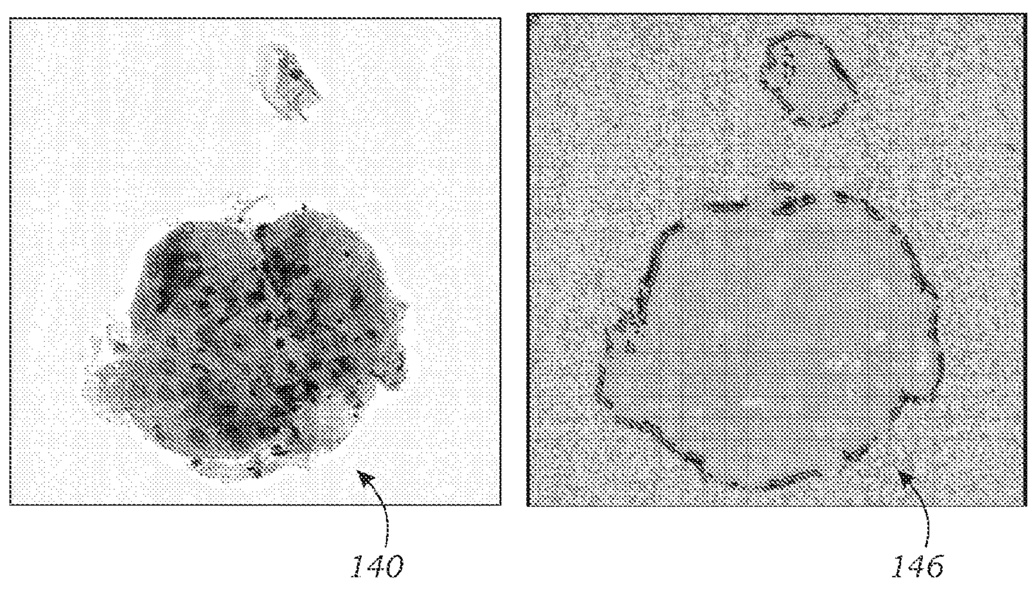
FIG. 6 illustrates an example of a merged image and its associated graphical pixel depth map.
Figure 11:
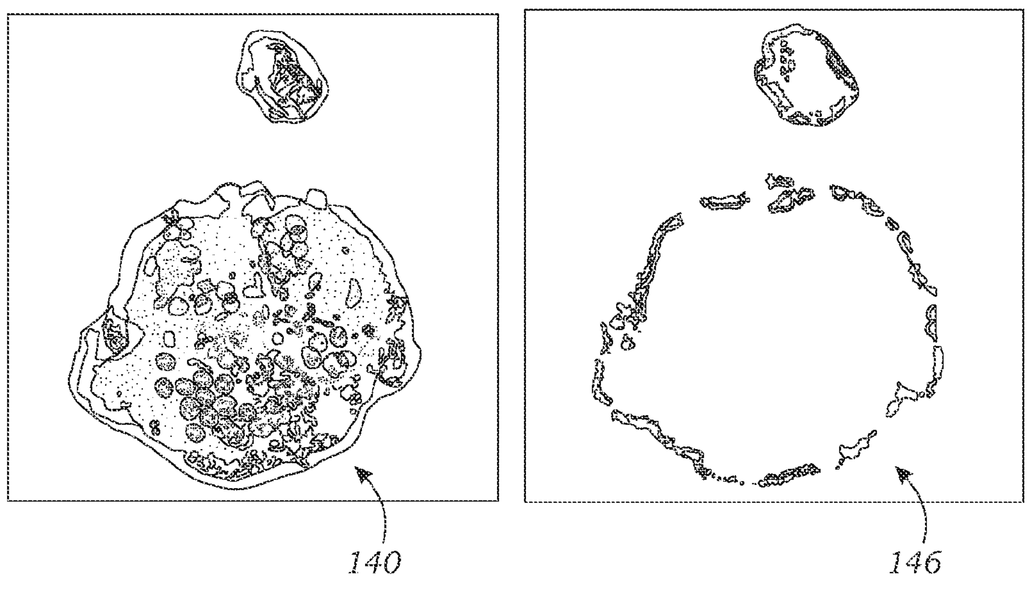
FIG. 11 is a line drawing replicating FIG. 6, and illustrates an example of a merged image and its associated graphical pixel depth map.

The image processor 124 also generates a pixel depth map associating each best focus pixel with a depth value (e.g., the image plane 132 in which the best pixel focus originated in the through-focus image stack 134). The pixel depth map associates each best focus pixel with a depth value, such as by associating each best focus pixel with the image plane 132 in which the best pixel focus originated in the through-focus image stack 134. FIG. 6 (and/or FIG. 11, line drawing) illustrates an example of a merged image 140 and its associated pixel depth map 146 in which the color (greyscale used in this example) represents the origination image plane 132 for each best focus pixel in the merged image.

There are two primary options for storing the merged image 140 and pixel depth map. As one option, the merged image 140, as pyramided, is stored as a standard image file, such as a TIF or JPG file, having multiple channels (e.g., RGBA file, where the "A" channel is normally the opacity of the image) and the pixel depth map is stored in one of the channels of the digital image file (e.g., the "A" channel of an RGBA image file). In a second option, the pyramided merged image 140 may be stored as a digital image file (e.g., a TIF or JPG file) and the depth map may be stored in a separate file from the digital image file. In the case that only 14, or fewer, image planes 132 are utilized in the merged image 140, a 4 bit per pixel image can be utilized, leading to reduced storage requirements, especially if image compression can be used.

Each pyramided merged image 140 and its associated pixel depth map are then stored in the remote storage device/server 126. The remote storage device/server 126 comprises data storage which is accessible by the image review station 100 via a communication network 144. The communication network 144 may include one or more of a LAN, WAN, the internet (e.g., virtual private network (VPN)), and/or other suitable network. As some examples, the remote storage device/server 126 may be a private data server, or a third-party cloud storage system.

Referring back to FIG. 1, the image review station 100 is configured to access the merged images 140 and respective pixel depth maps and pyramid images, and to display the merged images 140 on the display device 104, including generating and displaying pseudo-focus images of the merged images 140 to provide a sense of depth of the subject matter in the merged images 140. As described herein, the merged image 140 includes all of the best focus pixels, and therefore, all of the merged image is substantially in-focus, thereby effectively "flattening" the image into a single plane. As a result, it may be difficult or impossible to see the relative depth of the objects, or to determine the extent or boundary of an object, or differentiate separate objects (e.g., where the images of objects overlap). Accordingly, in the context of cytology, it may not be possible to discern whether an oddly shaped object is a single, oddly shaped cell, or two cells that are overlapping but which are at different depths of the sample (i.e., two objects in different image planes of the original image stack). Therefore, a cytologist cannot properly analyze and characterize such cells, which could cause overlooking cell abnormalities in the specimen indicative of a disease state, thereby preventing the cytotechnologist from making an accurate diagnosis. Instead of storing all of the plurality of digital images at different image planes for different depths of the subject matter 130, the image review station 100 is able to use the entirely in-focus merged image 140 and the pixel depth map to generate a pseudo-focus image which simulates the blur of objects in the merged image which are not within the depth of field of a selected image plane 132 (i.e., a POI) currently being viewed. Accordingly, the image processing software application 112*a* is configured to program the image review station 100 to access a merged image 140 and associated pixel depth map and pyramid image, and generate and display pseudo-focus images of the merged images 140 for selected image planes.

The image review station 100 generates the pseudo-focus images of a merged image by applying a blur function to simulate the blur observed in viewing a field of view having a depth which extends beyond the DOF. The DOF is in-focus range between the nearest and farthest region of the field of view that is in sharp focus and there is essentially no difference in the focus quality to the viewer. Quantitatively, the DOF is approximately the mean wavelength of light (~580 nm) divided by the Numerical Aperture (NA) squared:

$$DoF = \frac{\lambda}{NA^2}$$

The Numerical Aperture is effectively how steeply light converges at the focal point. In air, it is defined as the radius of the entrance or exit pupil at the first principal plane divided by the focal length. The effective NA (NAeff) is used when the illumination NA is smaller than the imaging NA at the sample. It is an average of the two, and functions well to determine the expected amount of optical blur due to defocus. The equation to calculate NAeff is as follows:

$$NA_{eff} = NA_{im}\left(1 + \frac{NA_{ill}}{NA_{im}}\right)/2$$

The image processing performed by the image review station 100 to generate pseudo-focus images is predicated on some basic optical effects. One way to simulate optical blur is to convolve a 2D Gaussian function across an image, which is effectively what aberration-free optical blur does. This is not the same as the real optical blur in a microscope because there are both aberrations and partial coherence effects, which are not accounted for with this method. However, to a user, such blurred images will generally appear natural.

It is desired that the amount of simulated optical blur in the pseudo-images is as close as possible to the real amount of optical blur, therefore the optical parameters of the imager 122 are used to calculate the Gaussian blur radius. This radius is impacted by the DOF of the optical system, the distance from best focus, and the NAeff.

In the imager 122 disclosed herein, the NAeff is calculated from the imaging NA and the illumination NA. For instance, for a typical imaging NA of 0.75 and typical illumination NA of 0.3, the NAeff is calculated as 0.525. At 580 nm, this results in a DOF of 0.580 um/0.5252=2.10 um.

To determine the Gaussian blur radius, the NAeff is again used. The NAeff defines a cone angle for the light, outside of the DOF, so the blur radius is defined by the following formula:

$$GaussianBlurRad\,[FocusOffset] = \left(FocusOffset - \frac{DoF}{2}\right) * NAeff$$

The Gaussian blur function is then:
Gaussian2D [GaussianBlurRad]

To calculate the focus offset (FocusOffset) in the formula above, in order to apply the blur function, we need to start with a selected first POI from the plurality of image planes 132 of a merged image 14, which the user selects. For instance, the first POI may be selected in response to a user input using an input device 114 while viewing the merged image 140 on the image review station 100. The input device 114 may adjust a slider, dial, or the like, to scroll up and down through the plurality of image planes 132 to input the first POI.

Using the example of FIG. 2 in which there are 14 image planes 132*a*-132*n*, numbered image plane 0—image plane 13, we start with the example that the user selects the "middle" image plane. This would be image plane 7 (image plane 132*h*). The pixel depth map contains image plane data for each pixel in the merged image, 0 through 13. So, for each pixel, there is a difference between the POI and the depth map value. This is the pixel's plane offset. The plane offset can be converted into a focus offset by multiplying by the Z offset between planes, which, for this example, is 1.85 μm. Accordingly, the focus offset for each pixel is given by the following equation for the offset at pixel position (px, py):

$$FocusOffset_{px,py}\,[POI] = |POI - Heatmap_{px,py}| * PlaneZOffset$$

Once the Focus Offset is determined for a given pixel, a 2D Gaussian blur function is applied to mix that merged image pixel with nearby pixels to create the value of the blurred pixel. The entire pseudo-focus image of the merged image is generated by essentially convolving the 2D Gaussian blur function across the entire merged image, where the Gaussian blur kernel is a function of the pixel position (i.e., pixel position gives the focus offset, which gives the blur radius, which gives the kernel parameters).

As different POIs of the plurality of image planes are selected by the user, the image review station 100 repeats this process to generate the pseudo-focus image for each POI and to display the pseudo-focus image on the display device 104.

The application of the blur function to generate the pseudo-focus images is essentially the convolution of a Gaussian function over the original merged image, taking a radius as input. Most image processing packages use Fast Fourier Transforms (FFT's) to generate the blur, which is substantially faster than standard convolutions. In this case, a different blur function needs to be applied per pixel. If performing this method using a conventional convolution, the kernel could actually be changed by pixel according to the depth map. However, in practice, it is faster to simply apply the blur function to the original image for each of the possible focus offsets to generate focus offset images corresponding to each possible focus offset, and then select pixels from the appropriate offset images to create the amalgamated pseudo-focus image. This is done by generating a pixel focus offset array by calculating a pixel focus offset for each best focus pixel equal to the difference between the depth value of the first POI and the respective depth value for each best focus pixel. The pixel focus offset array defines a first range of pixel focus offsets within which a plurality of focus offset values are defined. For instance, in the example of FIG. 2, and image plane 7 (image plane 132*h*) as the selected POI, the range of pixel focus offsets is 0 to 7 (i.e., the focus offset of each image plane is the absolute value of the difference between the image plane value and the first POI; hence image plane 0 has a first focus offset of 7, image plane 1 has a first focus offset of 6, . . . image plane 7 has a first focus offset of 0, image plane 8 has a first focus offset of 1, and so on).

Figure 7:
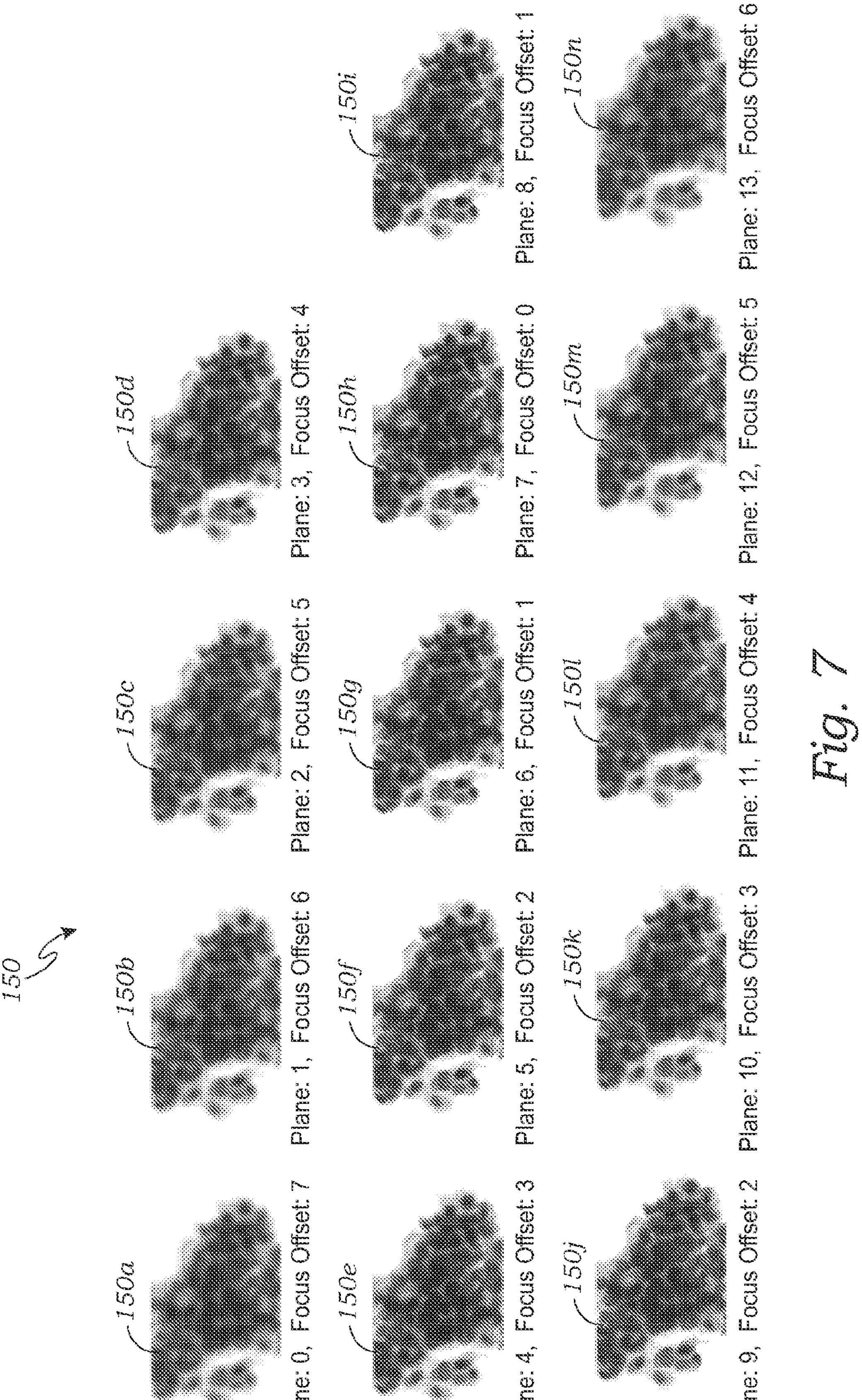
FIG. 7 illustrates graphic examples of focus offset images generated for an example merged image for a focus offset range based on a selected plane of interest.
Figure 12:
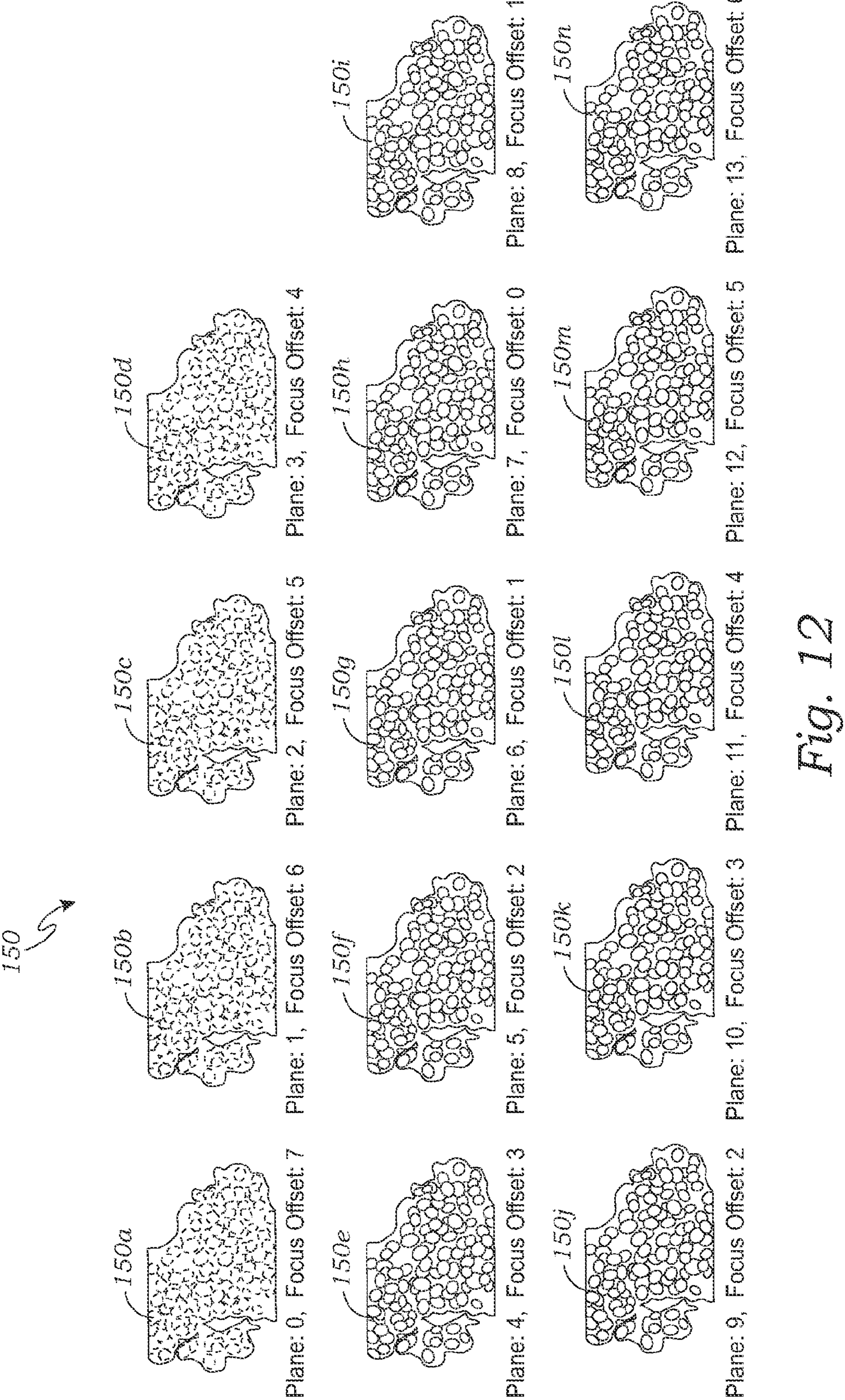
FIG. 12 is a line drawing replicating FIG. 7, and illustrates graphic examples of focus offset images generated for an example merged image for a focus offset range based on a selected plane of interest.

A plurality of focus offset images are generated which correspond to each focus offset within the range of the pixel focus offset array. Each focus offset image is generated by: (1) generating a blurred focus value for each of the focus offset values, and (2) for each focus offset value, applying a respective blurred focus value to the merged image. In the example of FIG. 2, and image plane 7 (image plane 132*h*) as the selected POI, this process generates a focus offset image for each focus offset from 0 to 7, in which each focus offset image includes a blurred focus value for the respective focus offset for every best focus pixel. FIG. 7 (and/or FIG. 12, line drawing) illustrates graphic examples of the focus offset images 150 for focus offsets 0 to 7. As shown in FIG. 7 (and/or FIG. 12, line drawing), the focus offset image 150*a* for a focus offset of 7 is an image with all of the pixels in the merged image at a blurred focus value of 7, the focus offset image 150*b* for a focus offset of 6 is an image with all of the pixels in the merged image at a blurred focus value of 6, and so on for focus offsets from 0 to 7. As can be seen in FIG. 7 (and/or FIG. 12, line drawing), there are two different planes 132 associated with the same focus offset image for focus offsets of 1 to 6, because both image plane 1 and image plane 13 have the same focus offset of 6, both image plane 2 and image plane 12 having the same focus offset of 5, both image plane 3 and image plane 11 have the same focus offset of 4, both image plane 4 and image plane 10 have the same focus offset of 3, both image plane 5 and image plane 9 have the same focus offset of 2, and both image plane 6 and image plane 8 have the same focus offset of 1.

Figure 8:
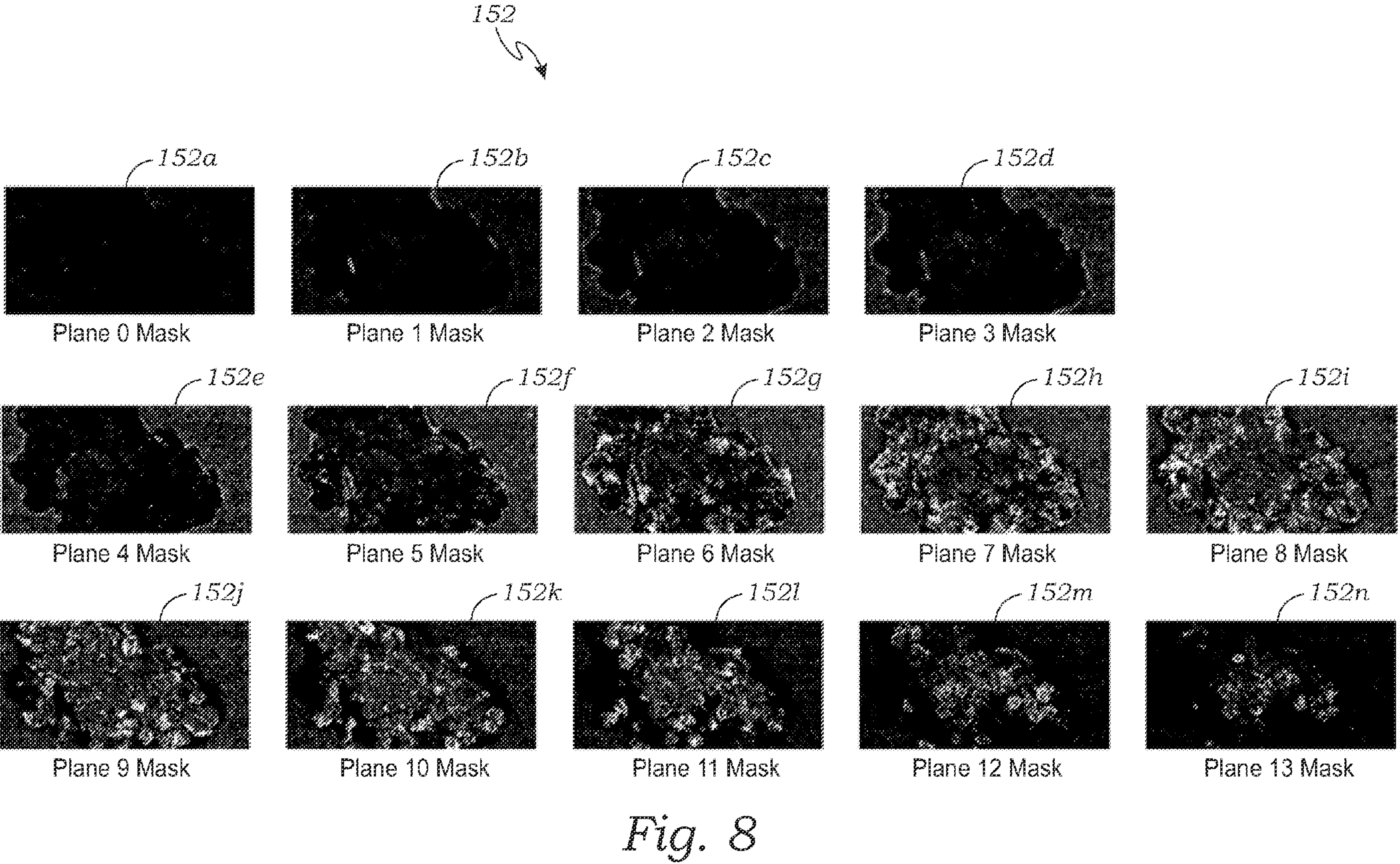
FIG. 8 illustrates graphic examples of focus masks for a plurality of image planes of the example merged image of FIG. 7.
Figure 13:
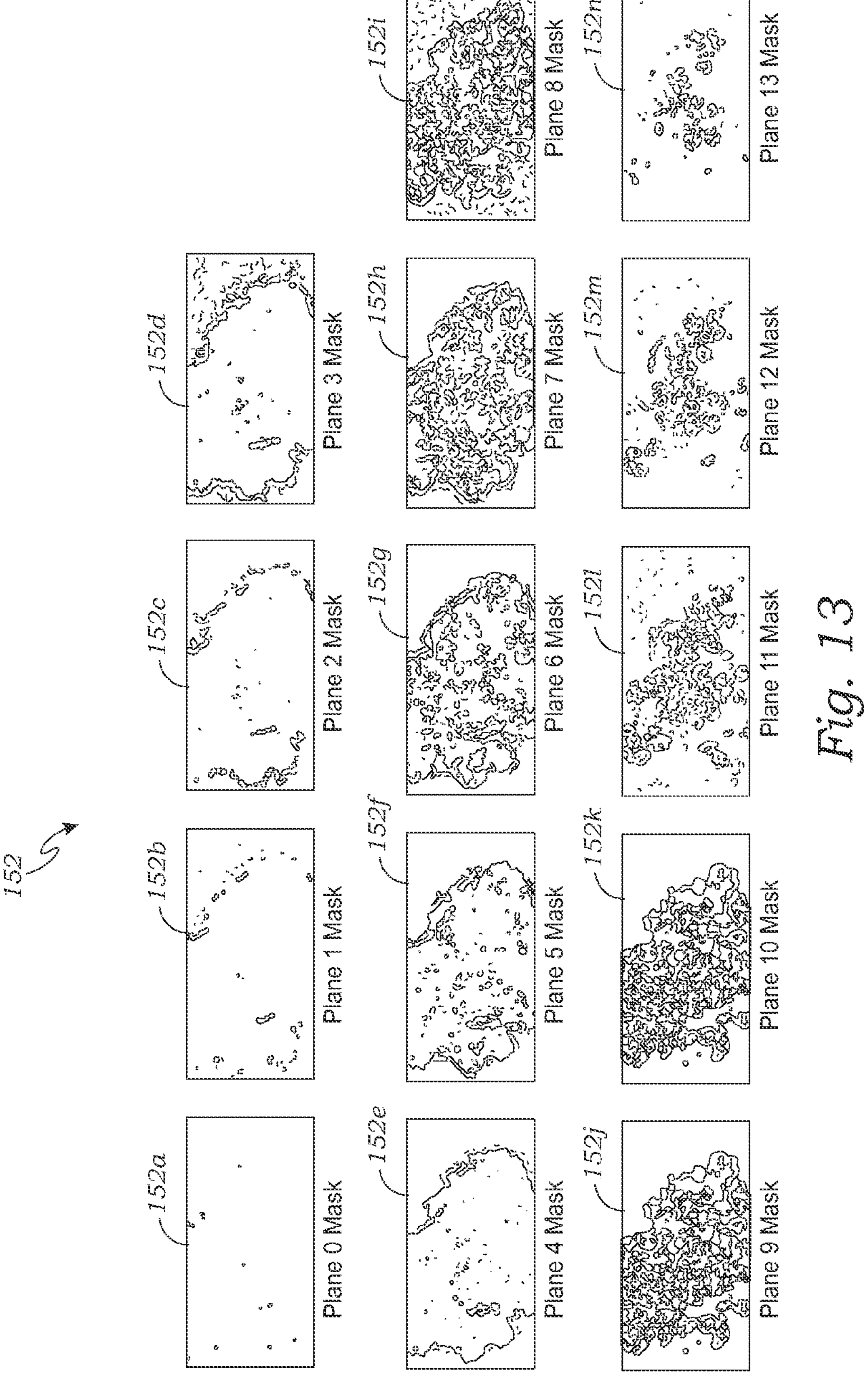
FIG. 13 is a line drawing replicating FIG. 8, and illustrates graphic examples of focus masks for a plurality of image planes of the example merged image of FIG. 12.

The image review station 100 also generates a focus mask 152 for each image plane 132. Each focus mask 152*a*-152*n* contains all of the best focus pixels associated with the respective image plane. For example, a focus mask 0 (152*a*) consists of all of the best focus pixels within image plane 0, a focus mask 1 (152b) consists of all of the best focus pixels within image plane 1, and so on. FIG. 8 (and/or FIG. 13, line drawing) illustrates graphic examples of the focus masks 152 for image planes 0 to 13 for the example of FIG. 2.

Then, the pseudo-focus image of the merged image for a selected POI is generated by summing the product of (1) the focus mask 152 for a respective image plane and (2) the focus offset image 150 having the focus offset value corresponding to the respective image plane 132, for each image plane 11 of the plurality of image planes 132. In the example of FIG. 2, and image plane 7 (image plane 132*h*) as the selected POI, the table of FIG. 9 shows, for each image plane 132, the focus offset and the product of the focus mask and the focus offset image for each respective image plane. Hence, in this example, focus mask 0 is associated with focus offset image 7, focus mask 1 is associated with focus offset image 6, focus mask 2 is associated with focus offset image 5, focus mask 3 is associated with focus offset image 4, focus mask 4 is associated with focus offset image 3, focus mask 5 is associated with focus offset image 2, focus mask 6 is associated with focus offset image 1, focus mask 7 is associated with focus offset image 0 (the merged image, i.e., no blur), focus mask 8 is associated with focus offset image 1, focus mask 9 is associated with focus offset image 2, focus mask 10 is associated with focus offset image 3, focus mask 11 is associated with focus offset image 4, focus mask 12 is associated with focus offset image 5, and focus mask 13 is associated with focus offset image 6. Hence, the pseudo-focus image for the POI being image plane 7 is the sum of the third column in the table of FIG. 9.

Figure 10:
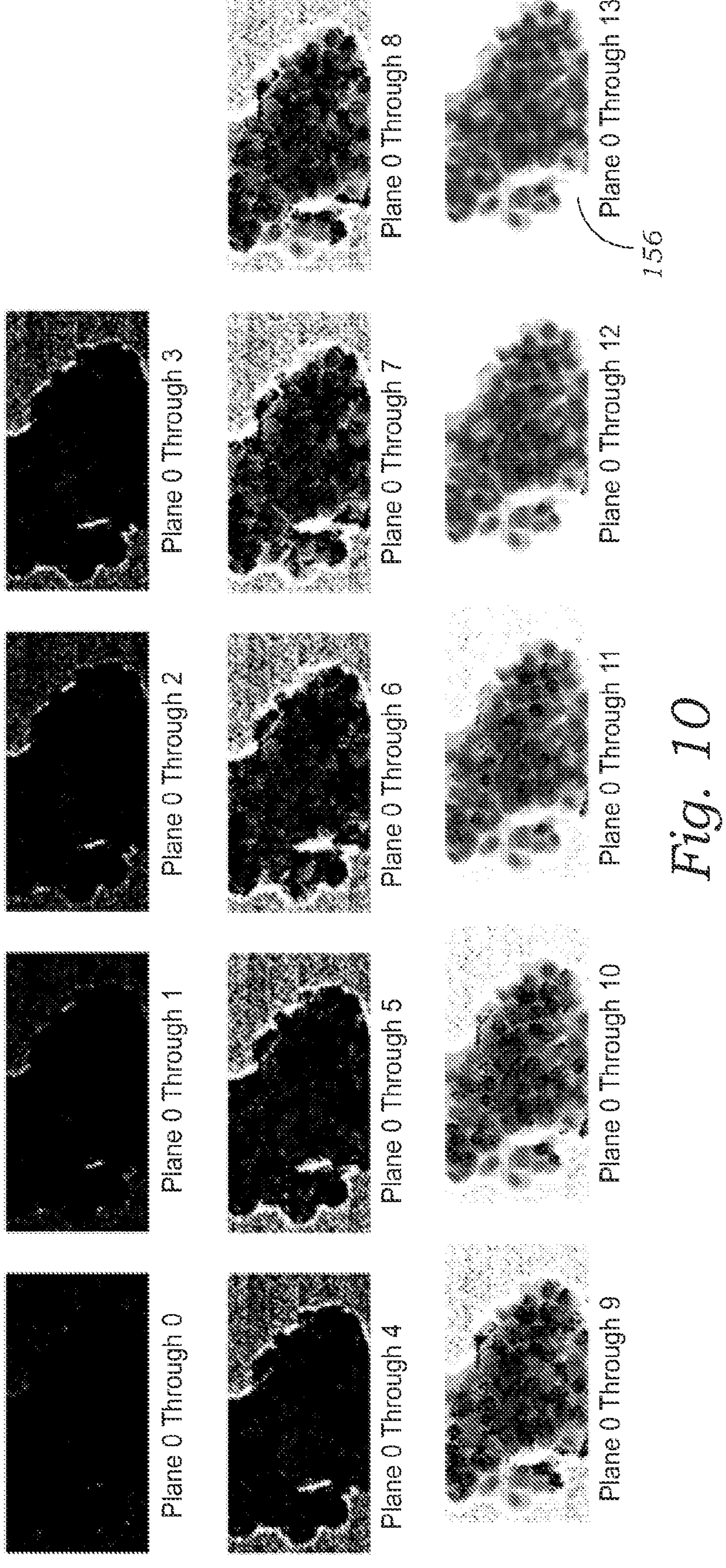
FIG. 10 illustrates a graphical example of the assembly of a final pseudo-image by summing the products of the focus masks and associated focus offset images for each image plane, for the example merged image of FIG. 7.
Figure 14:
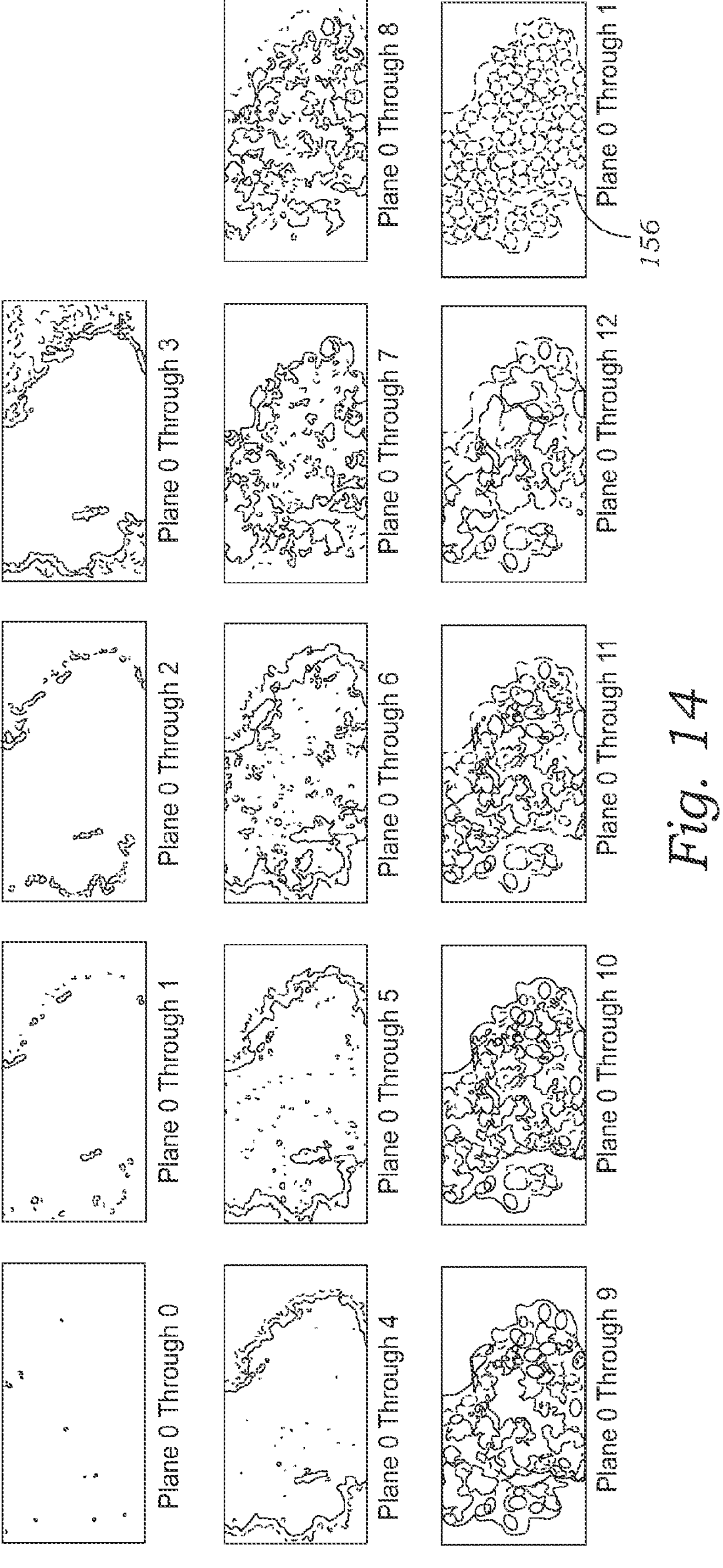
FIG. 14 is a line drawing replicating FIG. 10, and illustrates a graphical example of the assembly of a final pseudo-image by summing the products of the focus masks and associated focus offset images for each image plane, for the example merged image of FIG. 12.

FIG. 10 (and/or FIG. 14, line drawing) shows a graphical example of the final pseudo-image assembly by summing the products of the focus masks 152 and associated focus offset images 150 for each image plane 132. For context, the sum of all of the focus masks 152 is a completely white image, but the sum of each focus mask 152 multiplied by its associated focus offset image 150 is the final pseudo-focus image 156.

One of the largest, processing intensive tasks in generating the pseudo-focus images is generating the blurred images, i.e., generating each of the focus offset images. By comparison, the generation of the focus masks and pseudo-image sums are comparatively very quick. Since the generation of a pseudo-focus image for any of the image planes 132 selected as the POI utilizes the same focus offset images, while the field of view being displayed remains the same, these same focus offset images can be stored in a buffer for use in generating and displaying pseudo-images for any selected POI as the user scrolls up and down through the plurality of image planes 132. Indeed, it is likely that the user will repeatedly move the POI (i.e., the image plane 132 which is in focus in the pseudo-focus image) to examine differences in the images, so the buffer may smooth out processing times considerably. This can assist in allowing the image review station 100 to display the pseudo-focus images for successively selected POIs as the user scrolls through the image planes in substantially real-time. Furthermore, any one or more of the pseudo-focus images for selected POIs can be stored, such as in a buffer or otherwise, as the POIs are selected and respective pseudo-focus images are generated. Then, if the user selects a previously selected POI, the method displays the stored pseudo-focus image for such POI. The buffering may smooth out the processing times for displaying the pseudo-focus images in substantially real-time.

Hence, in order to generate a pseudo-focus image of the merged image 140 at another POI, the image review station 100 need only generate additional focus offset images for those focus offsets outside the range of focus offset for which focus offset images were previously generated. The additional focus offset images are generated in the same manner as the previously generated focus offset images. Continuing the example of FIG. 2 above, say that image plane 10 is selected as the next POI. The range of focus offset values for this next POI as image plane 10 is from 0 to 10 (image plane 0 has a focus offset value of 10, image plane 1 has a focus offset value of 9, image plane 2 has a focus offset value of 8, image plane 3 has a focus offset value of 7, image plane 4 has a focus offset of 6, image plane 5 has a focus offset of 5, image plane 6 has a focus offset of 4, image plane 7 has a focus offset of 3, image plane 8 has a focus offset of 2, image plane 9 has a focus offset of 1, image plane 10 has a focus offset of 0, image plane 11 has a focus offset of 1, image plane 12 has a focus offset of 2, and image plane 13 has a focus offset of 3). Hence, focus offset images have previously been generated for focus offset values 0 to 7, and additional focus offset images for only focus offset values 8 to 10 need to be generated for creating a pseudo-focus image for image plane 10. After generating the focus offset images for focus offset values 8 to 10, the pseudo-focus image is generated in the same manner described above for image plane 7, of course with the proper association of the focus masks with a respective focus offset image for image plane 10 as the POI. Now, these newly generated focus offset images for focus offset values 8 to 10 may also be buffered for use where needed to generate a pseudo-focus image for subsequently selected POIs.

This process of generating, and displaying, a pseudo-focus image of the merged image may be repeated for the selection of any POI.

Although particular embodiments have been shown and described, it is to be understood that the above description is not intended to limit the scope of these embodiments, and that such disclosure is provided for purposes of explanation and illustration only. Thus, various changes and modifications may be made to the disclosed embodiments without departing from the scope of the following claims. For example, not all of the components described in the embodiments are necessary, and alternative embodiments may include any suitable combinations of the described components, and the general shapes and relative sizes of the components may be modified. Furthermore, while the system and method embodiments have been described with reference to cytological samples as the subject matter of the digital images, they can be configured and utilized with any types of subject matter.

What is claimed is:

1. A method for generating a pseudo-focus image of a digital image of a subject matter having a three-dimensional volume, comprising:

accessing: (1) a merged image of the subject matter having the three-dimensional volume, the merged image comprising an image generated from best focus pixels selected from a plurality of images of the subject matter which form a through-focus image stack, the best focus pixels originating from different respective image planes at different respective depths of the subject matter, each image plane being one of a plurality of image planes which stack up to form at least a partial depth of the subject matter; and (2) a pixel depth map associating each best focus pixel with a respective image plane corresponding to a depth value at which each best focus pixel originated within the subject matter;

selecting a first plane of interest (POI) from the plurality of image planes;

calculating a first pixel focus offset for each best focus pixel equal to a difference between a depth value of the first POI and the respective depth value for each best focus pixel;

generating a first blurred focus value for each best focus pixel based on the respective first pixel focus offset; and generating a first pseudo-focus image of the merged image for the first POI composed of the first blurred focus values for each best focus pixel, wherein generating the first blurred focus value for each best focus pixel based on the respective pixel focus offset, comprises:

generating a pixel focus offset array having a pixel focus offset for each best focus pixel equal to the difference between the depth value of the first POI and the respective depth value of each best focus pixel, the pixel focus offset array defining a range of pixel focus offsets within which a plurality of focus offset values are defined, and generating a plurality of focus offset images corresponding to each first focus offset within the range of the pixel focus offset array by: (1) generating a blurred focus value for each of the focus offset values, and (2) for each focus offset value, applying a respective blurred focus value to the merged image, and wherein generating the first pseudo-focus image of the merged image for the first POI composed of the first blurred focus values for each best focus pixel, comprises:

generating a focus mask for each image plane, wherein each focus mask contains all of the best focus pixels associated with the respective image plane; and summing the products of (1) the focus mask for a respective image plane and (2) the focus offset image having the focus offset value corresponding to the respective image plane, for each image plane of the plurality of image planes.

2. The method of claim 1, further comprising:

displaying the first pseudo-focus image on a display device.

3. The method of claim 2, wherein the display device is selected from the group consisting of: an LCD display; an LED display; an OLED display; and a computer monitor.

4. The method of claim 1, further comprising:

selecting a second POI from the plurality of image planes different from the first POI;

calculating a second pixel focus offset for each best focus pixel equal to the difference between the depth value of the second POI and the respective depth value for each best focus pixel;

generating a second blurred focus value for each best focus pixel based on the respective second pixel focus offset; and generating a second pseudo-focus image of the merged image for the second POI composed of the second blurred focus values for each best focus pixel.

5. The method of claim 4, further comprising:

displaying the second pseudo-focus image on a display device.

6. The method of claim 1, wherein the plurality of images of the subject matter used to generate the merged image are captured with a camera having an optical axis which is orthogonal to a slide surface to which the subject matter is affixed.

7. The method of claim 1, wherein the first blurred focus value for each best focus pixel is generated using a two-dimensional Gaussian blur function.

8. The method of claim 7, wherein two-dimensional Gaussian blur function utilizes a Gaussian blur radius based upon a depth of field of a camera system used to obtain the plurality of images of the subject matter.

9. The method of claim 8, wherein the Gaussian blur radius is also based upon an effective numerical aperture of the camera system.

10. The method of claim 1, wherein the merged image is an RGB digital image file and the pixel depth map is stored in a channel of RGB digital image file.

11. The method of claim 1, wherein the merged image is stored as a digital image file and the pixel depth map is stored in a separate file from the digital image file.

* * * * *